Figure 1:
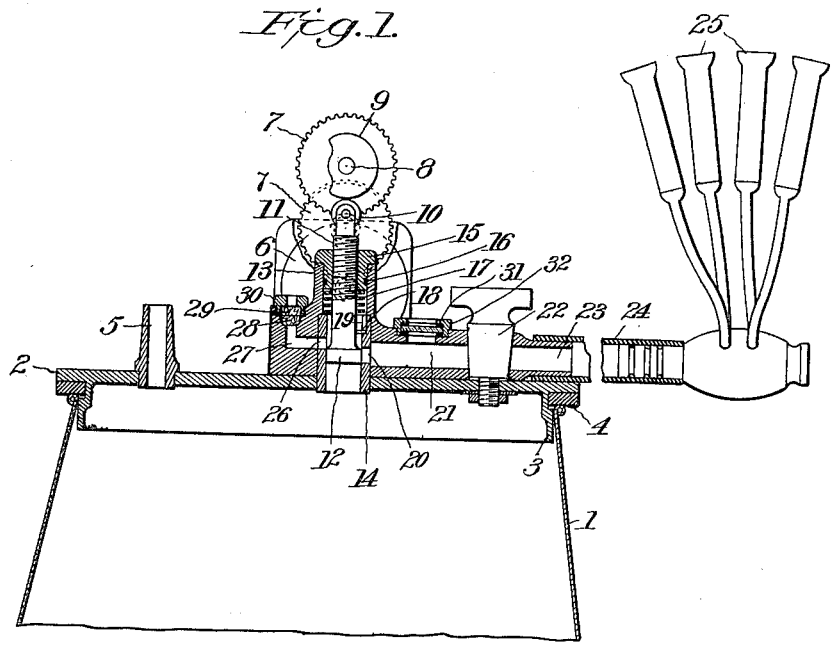

F. E. NEWELL.
COW MILKING MACHINE.
APPLICATION FILED APR. 24, 1907.

1,029,216.

Patented June 11, 1912.

Witnesses
C. H. Walker.
Lillie M. Perry.

Inventor
Fred Elton Newell
by Wm. F. Finckel
Attorney

UNITED STATES PATENT OFFICE.

FRED ELTON NEWELL, OF WESTMINSTER, VERMONT, ASSIGNOR TO VERMONT FARM MACHINE COMPANY, OF BELLOWS FALLS, VERMONT, A CORPORATION OF VERMONT.

COW-MILKING MACHINE.

1,029,216.    Specification of Letters Patent.    Patented June 11, 1912.

Application filed April 24, 1907. Serial No. 370,102.

*To all whom it may concern:*

Be it known that I, FRED ELTON NEWELL, a citizen of the United States, residing at Westminster, in the county of Windham and State of Vermont, have invented a certain new and useful Improvement in Cow-Milking Machines, of which the following is a full, clear, and exact description.

This invention relates to cow milking machines of that class generally known as pulsators, wherein suitable means is employed for varying or interrupting the suction in the milk tube at predetermined intervals, in order to follow the natural method of withdrawing the milk. In the apparatus of this general class, suction pipes have been arranged in the cow barns and connected at one end to a suction pump, vacuum tank or the like, and at each stall is arranged means whereby the pipe may be coupled to a milk receiving vessel in order to maintain a partial vacuum therein. Each milk receiving vessel is provided with milk tubes having suitable cups which are attached to the teats. In operating these devices it has been found that the exercise of constant suction on the teats failed to produce the full yield of milk, and devices known as pulsators were introduced in order that the degree of vacuum might be varied, or at times broken, thus imitating the suction of the calf. These pulsators have been arranged in some cases at or adjacent to the vacuum producing mechanism, and in other cases have been arranged close to the milk receptacles. In all cases, however, the pulsating devices were operated either mechanically or by variation in the degree of suction or air pressure.

It has been found in practice that the pulsators located at one end of the suction pipe adjacent to the vacuum producing apparatus are ineffective, the degree of efficiency being reduced in inverse ratio to the length of the suction pipe. With local pulsators it is found that those pulsators most distant from the vacuum producing apparatus act sluggishly, and while the pulsating devices nearest to the vacuum producing apparatus are effective, the most distant ones are not acted upon with the proper force, and hence fail to secure the full yield.

A further objection to the use of the pneumatic pulsators resides in the fact that they are more or less sluggish in action, owing to the tendency of the plungers to stick in their cylinders, and do not respond quickly enough to secure the desired variation and maximum and minimum degrees of suction at the proper time.

It is the principal object of the present invention to overcome the above noted and other disadvantages, and to provide pulsating means, any number of which may be used and connected to a source of electric power, such as an electric generator, dynamo, or electric batteries, and in which all will act at uniform speed and at regular predetermined intervals, and in which the action of those most distant from the source of energy will be as perfect as that of those nearest to such source.

A further object of the invention is to provide a pulsator that will be quickly responsive, and in which the periods of high and low vacuum, or the periods of vacuum and free air entrance may be made absolute, thus securing the highest degree of efficiency and securing full yield of milk without danger of injury to the animal.

A still further object of the invention is to provide a pulsating mechanism which is operated by an electric motor and in which the periods of operation may be instantly varied.

A still further object of the invention is to provide a pulsator of very simple and economical construction in which the wearing parts are very few and very simple and can be replaced at a very small cost. These several objects and others coming within the principle of the invention will now be particularly described and then the parts, improvements or combinations will be particularly pointed out and distinctly claimed, it being understood that various changes in the form, proportions, size and minor details of the structure may be made without departing from the spirit or sacrificing any of the advantages of the invention.

Figure 2:
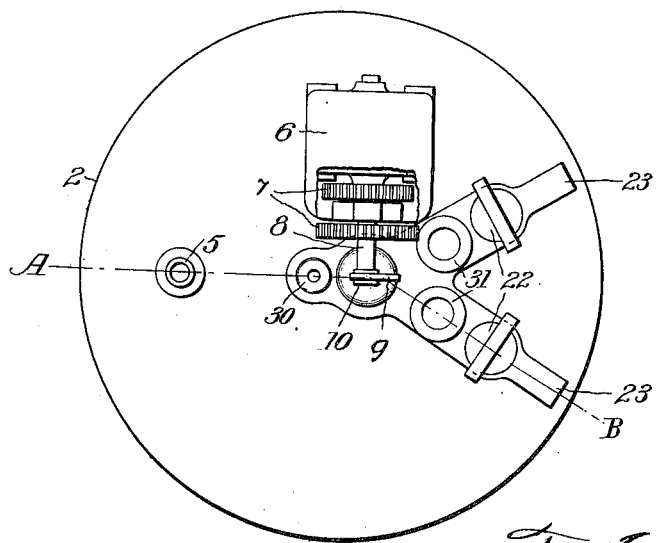

In the accompanying drawings, illustrating the invention, in the several figures of which like parts are similarly designated, Figure 1 is a general view in vertical section on line A—B of Fig. 2, part of the motor case being broken away to show the reduction and transmission gearing. Fig. 2 is a plan view, with part of the motor case broken away to show the reduction and transmission gearing.

1 is a milk receiving vessel of any approved construction and is provided with a top or cover 2 preferably having a flange 3 which enters the mouth of the vessel 1, and between the cover and the vessel is interposed a packing ring 4 to make the closure air-tight. The cover is provided with a nipple 5 for connection with the vacuum apparatus. On this cover is mounted an electric motor 6 of any approved construction and containing a reducing and transmission gearing 7, also of any approved construction. The upper shaft 8 of this reducing and transmission gearing is supplied with a cam 9 which contacts with a roller 10 on the stem 11 of a plunger or piston 12. This plunger or piston 12 is arranged in a cylinder 13, which is provided with a bushing 14, and the cylinder and its contained bushing are mounted upon the cover 2 and communicate freely with the interior of the milk receptacle 1. The stem has an adjustable nut 15 connected with it by a screwthreaded connection and extending into the cylinder and provided with a circumferential packing 16. Between this nut and the bushing 14 is arranged a coiled spring 17 to effect the return movement of the plunger after being moved downwardly by the cam 9. By adjusting the nut the proper tension may be given the spring to obtain its desired efficiency. The plunger has a laterally projecting pin 18 which plays in a groove 19 in the bushing to prevent the plunger from rotating. The bushing has a port 20 leading into the milk passage 21, and this milk passage has a valve or cock 22 and terminates in a nipple 23 which nipple receives the tube 24 of the milking cups 25, the latter being of any approved construction. The bushing also has a port 26 leading into the channel 27 which is the free air passage, and this passage has the enlargement 28 to receive any suitable sterilizing material 29, and this sterilizing material is held in place by means of a screw-cap 30. The milk passage 21 has in it an observation glass 31 held in place by a packed screw-cap 32. The cylinder 13 and its piston and operative adjuncts constitute the pulsator.

In the installation, there is located at some convenient point an electric generator (not shown) with wires extended through the cow barns, from which branch wires are taken to each milking machine, and by means of a "snap" connection are connected to the electric motor. By means of a simple switch the current is let on, and the electric motor 6 on each milk receiving vessel is set in motion. This operates the reduction or transmission gearing 7, which may be of any suitable construction. The object of this reduction gearing is to reduce the speed of the motor to give the desired number of pulsations per minute which are required to correctly operate the pulsator. On the drive shaft 8 of the reduction gearing is located the cam 9 which is offset eccentrically enough to carry the plunger 12 down the required distance to cover the port 20, and the spiral piston lifter spring 17 lifts the piston upward after the cam has passed its throw. The construction of one side of the cam is such as to hold the piston motionless in its highest position, for a short time, so as to give a period of rest before it takes on its downward movement again. As the plunger uncovers the port 20, the vacuum in the milk receiving vessel 1 causes a suction through the milk passages 21, and when connected at 23 by flexible pipe 24 to the teat cups 25 draws the milk. The cut-off cock 22 must be open to make the machine operative. A further object of the cut-off cock is to close the milk passage when necessary to prevent loss of vacuum at times when the flexible pipe is removed from one of the connections 23. For example, if it is desired to milk but one cow, this cut-off cock is closed, and the other branch of the pulsator will still be operative.

Referring now to the free air port 26: The piston covers this port as it rises, and uncovers it at each downward movement, and allows a small quantity of free air to enter the milk passage 21, which momentarily reduces the vacuum therein and causes the suction to cease until the plunger or piston moves upward again and covers this free air port, when the suction produced by the vacuum in the milk receptacle again becomes active. These two features, the action of the vacuum and the entrance of the free air, produce the suction and the periods of rest, each alternating. The enlargement at the top of the free air passage is for the purpose of storing a small quantity of sterilized material to prevent the admission of dust or impure air. The cap 30 that screws on to partially cover the enlarged part of this air passage protects and keeps the sterilized material in place. This cap is taken off when necessary to replace the sterilized material. The contact roller 10 placed in the top of the plunger prevents wear of the piston and the cam as the latter revolves against said roller. This roller provides a rolling contact and overcomes the consequent binding and sticking of a rubbing contact where no roller is provided.

The office of the adjustable tension and packing nut 15 is to give greater or less tension to the lifter spring 17 below it as required, and also to provide a guide at the top end of the plunger to keep it in perfect alinement with the bottom or piston end. The packing material 16 is placed in a groove in the outside wall of the tension and packing nut to make a smoothly operating bearing and to prevent leakage, and it is easily replaced in case of wear. The port bushing 14 is a plain metal cylinder; in which are located the port openings to the milk and the free air passages. It can be readily replaced in the event of its inside diameter becoming worn by the travel up and down of the piston 12. It can also be easily removed and replaced for cleaning, if necessary, which is a valuable feature. The observation glass 31, which has an opening below it into the milk passage 21, is a convenience, so that the operator can see if the milk is flowing. The vacuum within the milk vessel 1 creates a suction and holds the cover 2 down, and the joint between the two is made air-tight by means of the suction and flexible packing ring. This pulsator, with its electric motor drive, can be attached to any milking machine using vacuum or compressed air connections, either or both.

In those milking machines where air is used to drive the pulsator, difficulty is experienced in keeping up speed owing to leakage of air and the consequent reduction of the vacuum. By the use of electricity as the motive agent for actuating the pulsator and its entire independence of the air system and any maintenance of the vacuum, it is possible to keep up the speed at all times, whether there is leakage of air or not. The same difficulty is experienced where the pulsator is driven by compressed air on one side and vacuum on the other. Again, condensation is encountered, especially in compressed air systems, where the air is heated by friction. The warmer the air, the greater the moisture, and consequently the greater the collection of water in the pipes and pulsator, resulting in a sluggish action, especially in cold climates. The use of electricity as the pulsator driving agent entirely eliminates all of these objections, and admits of speeding up the machine as desired, and the maintenance of such speed. Equipping each milk receptacle with its own pulsator and its own electric motor, gives a complete and independent portable apparatus.

What I claim is:—

In a milking machine using vacuum suction and free air in the operation of milking, the combination of a milk receptacle, a cover therefor, a pulsator mounted on said cover and having a piston cylinder provided with air and milk passages, the air passage communicating through the cylinder with the milk passage, the piston cylinder having its outer end provided with a movable packed nut, a piston arranged in said cylinder and having a stem extending through and engaging said nut and on which the nut is adjustable and with which it moves, a lifter spring seated in the cylinder and bearing against the nut and having its tension varied by adjustment of the nut on the stem, an electric motor arranged on the cover and adapted to actuate the piston in one direction, and means to effect the return stroke of the piston.

In testimony whereof I have hereunto set my hand this 22d day of April A. D. 1907.

FRED ELTON NEWELL.

Witnesses:
R. W. BIDWELL,
GRACE E. BROWN.